(No Model.)
H. C. BARTLETT & J. BURD.
Churn.
No. 237,658. Patented Feb. 8, 1881.
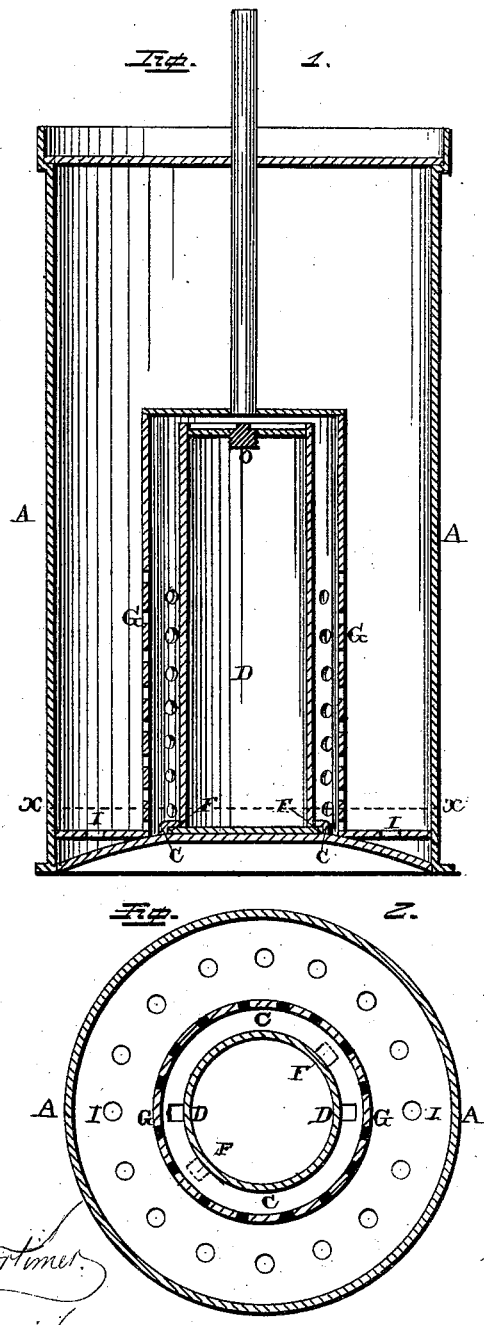
Witnesses:
Inventors:

UNITED STATES PATENT OFFICE.

HENRY C. BARTLETT AND JOHN BURD, OF COLUMBUS, OHIO.

CHURN.

SPECIFICATION forming part of Letters Patent No. 237,658, dated February 8, 1881.

Application filed January 3, 1881. (No model.)

*To all whom it may concern:*

Be it known that we, H. C. BARTLETT and JOHN BURD, of Columbus, in the county of Franklin and State of Ohio, have invented certain new and useful Improvements in Churns; and we do hereby declare the following to be a full, clear, and exact description of the invention, such as will enable others skilled in the art to which it pertains to make and use it, reference being had to the accompanying drawings, which form part of this specification.

Our invention relates to an improvement in churns; and it consists in a detachable water-cylinder, which is placed in the center of the bottom of the churn, in combination with a hollow perforated dasher which fits down over the cylinder, as will be more fully described hereinafter.

The object of our invention is to use a removable water-cylinder in the churn for the purpose of raising and lowering the temperature of the cream, and which cylinder will act in connection with the hollow dasher to break the globules of the cream.

Figure 1 represents a vertical section of a churn embodying our invention. Fig. 2 is a horizontal section of the churn, taken upon the dotted line x x of Fig. 1.

A represents the churn-body, of any desired construction, and which has a circular notched holding-flange or keeper, C, secured to its bottom. Upon the center of this bottom is placed the removable water-cylinder D, which is provided with the ears or projections F, which pass down through the two notches in the keeper C, and which, when the cylinder is given a partial turn, catch under the flange so as to hold the cylinder in place. This cylinder is to be filled with hot or cold water, so as to raise or lower the temperature of the cream, and is made removable from the churn for the purpose of being conveniently filled and emptied and to allow the churn to be washed out. In the top of this cylinder is made an opening, which is closed by a removable screw-plug, O.

The dasher G is cylindrical in shape, of a slightly greater depth than the water-cylinder is high, and enough larger in diameter than the cylinder to fit down over its top and to allow the cream to rise upward in the dasher to be forced out of the small holes in its sides. Around the lower edge of the dasher is formed a perforated flange, I, which just fits the inside diameter of the body A, so as to act as a guide to keep the dasher always in line with the water-cylinder, and up through which a portion of the cream is forced. As the dasher descends a portion of the cream is forced through the holes in the flange I, and a portion is forced up into the dasher and out of the holes in its sides, and as the dasher is raised upward the cream runs down through the holes in the flange and in the sides of the body, down to the bottom of the churn. The cream is thus constantly broken into fine streams or currents, and the butter quickly liberated or formed.

Having thus described our invention, we claim—

In a churn, the combination of the body A, having the notched circular flange or keeper C secured to its bottom, the removable water-cylinder D, provided with the ears F, for catching under the flange, and the hollow perforated dasher having the perforated flange I around its edges, the parts being arranged for operation, substantially as shown.

In testimony that we claim the foregoing we have hereunto set our hands this 23d day of December, 1880.

HENRY CLAY BARTLETT.
JOHN BURD.

Witnesses:
F. C. STRANG,
F. E. BURDELL.